RE25652

April 4, 1961 E. BLOCH ET AL 2,978,593

MAGNETIC FLIP-FLOP

Filed March 5, 1958

INVENTORS
ERICH BLOCH
ROBERT C. PAULSEN
BY
William V. Schelberg
AGENT

United States Patent Office 2,978,593
Patented Apr. 4, 1961

2,978,593

MAGNETIC FLIP-FLOP

Erich Bloch, Poughkeepsie, N.Y., and Robert C. Paulsen, Boonton, N.J., assignors to International Business Machines Corporation, New York, N.Y., a corporation of New York Filed Mar. 5, 1958, Ser. No. 719,268
9 Claims. (Cl. 307—88)

This invention relates to logical switching circuits and more particularly to a magnetic core circuit that functions as a flip-flop device and which does not require the use of diodes.

Magnetic core flip-flop circuits have been devised heretofore but in these circuits diodes or other suitable asymmetrical impedance devices are required for interconnecting the magnetic core elements. Circuitry for performing logical operation other than that of flip-flop and which avoid the need for diodes in the coupling circuits are described and claimed, for example, in copending application, Serial Number 528,594, filed August 16, 1955, now Patent No. 2,907,987, and another copending application, Serial Number 629,631, filed December 20, 1956, now Patent No. 2,844,151, on behalf of Louis A. Russell. The present invention is directed to flip-flop devices that may be employed with these latter components.

In accordance with this present invention, a flip-flop device is provided by interconnecting an OR circuit and a transfer circuit. An OR circuit may be described as a device having two input terminals, and a single output terminal at which a signal is developed whenever either one or the other input terminal receives an input signal, and a transfer circuit may be described as a device having a single input terminal and a single output terminal at which a signal is delivered whenever an input signal is directed to the input terminal. In both of these circuits as used in the present application, a storage magnetic core is provided having a control winding to which input signals are directed and from which output signals are also delivered. The output of the OR circuit is coupled to the input of the transfer circuit and the output of the transfer circuit is coupled to the first input terminal of the OR circuit. An input signal is selectively applied to the first terminal of the OR circuit which conditions the circuit to provide positive signal indications denoting the "ON" state of the flip-flop; while a reset input is applied intermediate the coupling of the OR circuit to the transfer circuit to switch operation of the flip-flop to the "OFF" state denoted by the absence of signal outputs. Since, by definition, there is an absence of signal output from either circuit unless there is a signal input, initial operation of the device provides no signal output, denoting the "OFF" state of the flip-flop. Upon application of a signal input to a terminal of the OR circuit, a signal output is provided to the transfer circuit which signal is fed back into the OR circuit, to provide the stable "ON" state of the flip-flop. Subsequently, an input, or reset signal, which inhibits the output from the OR circuit to the transfer circuit is applied, which signal resets the flip-flop to the "OFF" state.

A general object of this invention is to provide an improved flip-flop circuit component employing magnetic cores wherein conventionally used diode elements are not required.

A more specific object of this invention is to provide a flip-flop circuit wherein lower power requirements are achieved allowing the use of ferrite magnetic core elements with windings of relatively few turns.

Another object of this invention is to provide a logical circuit adapted to receive input pulses over a selectable time interval and to produce an output indication at a selectable time.

Other objects of the invention will be pointed out in the following description and claims and illustrated in the accompanying drawings, which disclose, by way of example, the principle of the invention and the best mode, which has been contemplated, of applying that principle.

Figure 1:
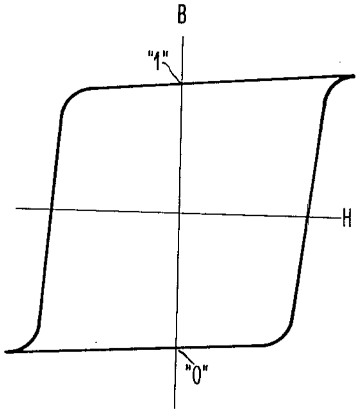
Fig. 1 is a representation of the hysteresis characteristic obtained for a material of the type employed.

Referring to Figure 1, the curve illustrates a plot of flux density (B) versus applied field (H) for a magnetic core having a substantially rectangular hysteresis characteristic. The opposite remanence states are conventionally employed for representing binary information conditions and are arbitrarily designated as "0" and "1." With a "0" stored, a pulse applied to a winding linking the core in the proper sense causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in the reverse sense to the same or another winding. Such a pulse is hereinafter referred to as a "read" pulse. Should a "1" have been stored, a large flux change occurs with the shift from "1" to "0" conditions with a corresponding voltage magnitude developed on an output winding. On the other hand, should a "0" have been stored, little flux change occurs and negligible signal is developed on the output winding.

A dot is shown adjacent one terminal of each of the windings indicating its winding direction. A write pulse is a positive pulse which is directed into the undotted end of the winding terminal which tends to store a "1," while a read pulse is a positive pulse directed into the dotted end of the terminal and tends to apply a negative magnetomotive force, or store a "0."

The arrangement disclosed employs input and output coupling magnetic cores arranged intermediate to so called storage cores which store certain logical information. These arrangements are adapted to be interconnected with each other and with similar type circuitry through such coupling cores. The coupling cores may be fabricated of ferrite materials like the storage or memory cores, however, it is not essential that these cores exhibit the rectangular hysteresis characteristic required of the storage cores, but should have a good $B_r/B_s$ ratio, as these devices function as variable impedance elements in controlling the transfer of information pulses, as will be more evident from the following description. Such interconnecting coupling cores are illustrated in the circuit and are labeled $C_1$, $C_2$, $C_3$ and $C_4$ for clarity. Also shown, are two storage cores designoted $S_1$ and $S_2$ which are adapted to store information received. The core $S_1$ is adapted to deliver information received to another storage core $S_2$ via the coupling core $C_3$. The storage core $S_2$ is adapted to receive information and deliver it to a further logical stage via the coupling core $C_4$ and to regenerate the information to the storage core $S_1$ via the coupling core $C_2$ in performing the flip-flop function.

Figure 2:
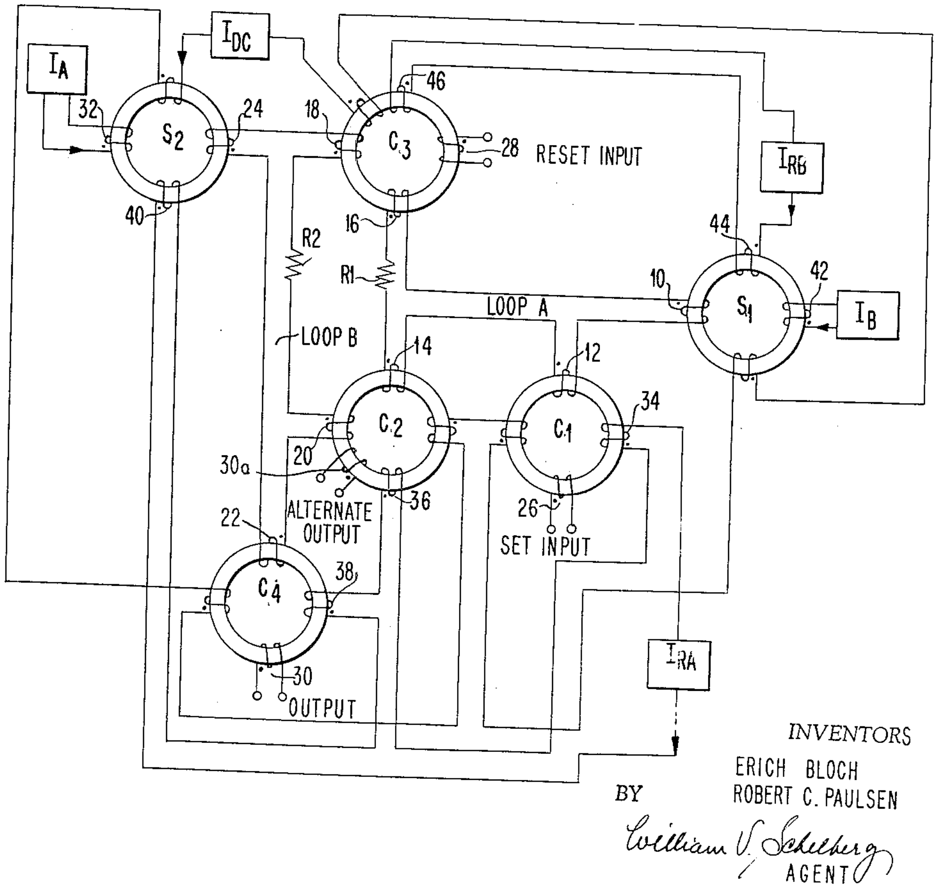
Fig. 2 is a circuit diagram of a magnetic core flip-flop circuit in accordance with this invention.

Referring now to Figure 2 in detail, the core $S_1$ is provided with a control winding 10 interconnected with an output winding 12 on the core $C_1$, an output winding 14 on the core $C_2$ and input winding 16 on the core $C_3$ through a resistor $R_1$, which interconnection will hereinafter be referred to as loop A. The core $C_3$ is further provided with a winding 18 which is interconnected with a winding 20 on the core $C_2$ through a resistor $R_2$, a winding 22 on the core $C_4$ and a control winding 24 on the core $S_2$, which interconnection will hereinafter be referred to as loop B. Inputs are applied to the circuit by a winding 26 on the core $C_1$ and a winding 28 on the core $C_3$ while an output is obtained from a winding 30 on the core $C_4$ or from an alternative output winding 30a in the core $C_2$. The storage core $S_2$ is energized from a clock pulse $I_A$, while the storage core $S_1$ is energized from a clock pulse source $I_B$. Both the cores $S_1$ and $C_3$ are energized from a clock pulse source $I_{RB}$, while the cores $C_1$, $C_2$, $C_4$, and $S_2$, are energized from a clock pulse source $I_{RA}$. A winding 32 is provided on the core $S_2$ connected with the source of $I_A$, while a winding 34 is provided on the core $C_1$, a winding 36 on the core $C_2$, a winding 38 on the core $C_4$ and a winding 40 on the core $S_2$ which are connected with the source $I_{RA}$. Similarly, a winding 42 is provided on the core $S_1$ which is connected with the source $I_B$, while a winding 44 is provided on the core $S_1$ and a winding 46 on the core $C_3$ which are connected with the source $I_{RB}$.

Figure 3:
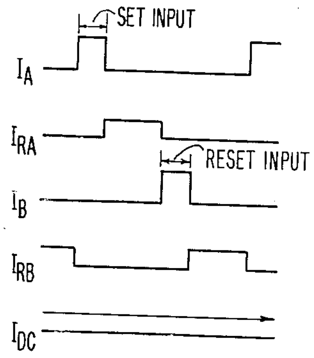
Fig. 3 illustrates the relative timing of current pulses which are required for operation of the circuit of Fig. 2.

The sequence of pulses provided by the several clock pulse sources described above is as indicated in the Figure 3, which sources are adapted to operate with the circuit as shown in the Figure 2, while the time of appearance of an input signal is shown to be the time at which the $I_A$ and $I_B$ clock pulse source operates.

Referring again to Figure 2, assume all cores are in the lower remanence condition or in the "0" residual state. Initially, let us consider operation of the circuit when there is an absence of inputs. The $I_A$ clock pulse source directs a read signal into the winding 32 on the core $S_2$ which tends to switch this core toward the "0" state. Since the core $S_2$ is already in the "0" state, negligible change takes place. At the termination of the $I_A$ clock pulse, the $I_{RA}$ clock pulse source directs a signal into the windings 34, 36, 38, and 40 on the cores $C_1$, $C_2$, $C_4$ and $S_2$, respectively, which tends to read each of these cores and reset them to the "0" state. Since the cores are already in the "0" state, no change takes place. Subsequently, the $I_B$ clock pulse source directs a read signal into the winding 42 on the core $S_1$ which signal has no effect since the core $S_1$ is already in the "0" state. After the termination of the $I_B$ clock pulse, the $I_{RB}$ clock pulse source directs a read signal into the windings 44 and 46 on the cores $S_1$ and $C_3$, respectively, which has no effect since, again, each of the cores is in the "0" state. Thus further operation of the several clock pulse sources in each cycle provides an absence of signal output and the first or "OFF" state of the flip-flop is realized.

Assume, after operation of the device as described above, a set input signal at $I_A$ time is directed to the winding 26 on the core $C_1$. The core $C_1$ is then switched from the "0" to the "1" state and in so doing induces a voltage in the winding 12 with the undotted end positive, causing a counter-clockwise current in loop A. This current in loop A tends to write the cores $S_1$ and $C_3$ and tends to read the core $C_2$. Since the core $C_2$ is already in the "0" state, it is unaffected, while the number of turns of the winding 10 on the core $S_1$, as compared to the number of turns of the winding 16 on the core $C_3$, is much greater, allowing preferential switching of the core $S_1$ from the "0" to the "1" state. Coincidently, the $I_A$ clock pulse source directs a read signal into the winding 32 on the core $S_2$ which again has no effect since the core $S_2$ is already in the "0" state. At the termination of the input signal and the $I_A$ clock pulse, the $I_{RA}$ clock pulse source directs a read signal into the windings 34, 36, 38, and 40 on the cores $C_1$, $C_2$, $C_4$, and $S_2$, respectively, which signal resets the core $C_1$ from the "1" to the "0" state. The core $C_1$ in resetting to the "0" state induces a voltage in the winding 12 with the dotted end positive, causing a clockwise current flow in the loop A. The clockwise current in loop A tends to write the core $C_2$ and read the cores $C_3$ and $S_1$. The possible deleterious effects of this clockwise current is damped by resetting the core $C_1$ slowly so that the current in loop A does not exceed read or write threshold for the core $C_2$, $C_3$ or $S_1$. After termination of the $I_{RA}$ clock pulse, the core $C_1$ is left in the "0" state and the core $S_1$ is left in the "1" state. Subsequently, the $I_B$ clock pulse source directs a read signal into the winding 42, on the core $S_1$ which signal switches the core from the "1" to the "0" state to induce a voltage in the control winding 10 with the dotted end positive. This induced voltage causes a counter-clockwise current in loop A which tends to write the core $C_3$ and read the cores $C_2$ and $C_1$. Since the cores $C_2$ and $C_1$ are already in the "0" state, the core $C_3$ is switched from the "0" to the "1" state. The core $C_3$ in switching to the "1" state induces a voltage in the winding 18 with the undotted end positive, causing a counter-clockwise current in loop B, which tends to write the cores $S_2$, $C_4$, and $C_2$. The number of turns of the control winding 24 on the core $S_2$ is much greater than the number of turns of either of the windings 22 or 20 on the cores $C_4$ or $C_2$, respectively, thereby providing preferential switching of the core $S_2$ from the "0" to the "1" state at this time. At the termination of the $I_B$ clock pulse, the $I_{RB}$ clock pulse source directs a read signal into the windings 44 and 46, on the cores $S_1$ and $C_3$, respectively, which signal resets the core $C_3$ from the "1" to the "0" state. The core $C_3$ in resetting, induces a voltage in the windings 16 and 18 with their dotted end positive. The induced voltage in the winding 18 causes a clockwise current in the loop B which tends to read each of the cores $C_2$, $C_4$ and $S_2$, while the voltage induced in the winding 16 causes a counter-clockwise current in the loop A which tends to read the cores $C_2$ and $C_1$ while also tending to write the core $S_1$. Resetting of the core $C_3$ is done slowly so that the loop currents do not exceed read or write threshold for any of the cores in the loops A or B, which action is similar with the resetting provided by the $I_{RA}$ clock pulse as described above. At the termination of the $I_{RB}$ clock pulse, the core $S_2$ is left in the "1" state while all other cores are left in the "0" state.

In the next cycle of operation, the $I_A$ clock pulse source directs a read signal into the winding 32 on the core $S_2$, which switches the core from the "1" to the "0" state to induce a voltage in the winding 24 with the dotted end positive. The induced voltage in the control winding 24 causes a counter-clockwise flow of current in the loop B which tends to write the cores $C_4$ and $C_2$ while tending to read the core $C_3$. Since the core $C_3$ is already in the "0" state, it is unaffected, while the cores $C_4$ and $C_2$ are switched from the "0" to the "1" state. The core $C_4$, in switching from the "0" to the "1" state, provides an induced voltage output in the winding 30 at this time. The output signal may be taken from this winding or the winding 30a on core $C_2$. The core $C_2$, in switching, also induces a voltage in the winding 14 with the undotted end of the winding positive causing a counter-clockwise current in loop A which tends to read the core $C_1$ and write the cores $S_1$ and $C_3$. Since the core $C_1$ is already in the "0" state and the core $S_1$ is provided as the preferential switching path as described above, the core $S_1$ is switched from the "0" to the "1" state. At the termination of the $I_A$ clock pulse, the cores $C_4$, $C_2$ and $S_1$ are left in the "1" state. The $I_{RA}$ clock pulse source now directs a read signal into the windings 34, 36, 38, and 40 on the cores $C_1$, $C_2$, $C_4$ and $S_2$, respectively, which switches the cores $C_4$ and $C_2$ from the "1" to the "0" state. The cores $C_4$ and $C_2$ in switching induce a voltage in the windings 22, 20, and 14 with their dotted end positive, causing a counter-clockwise current in loop B and a clockwise current in loop A. As described above, resetting of the cores by the $I_{RA}$ clock pulse is done slowly so as not to exceed read or write threshold for the cores in either the loop A or loop B. At the termination of the $I_{RA}$ clock pulse, the core $S_1$ is left in the "1" state and all other cores are left in the "0" state. The state of the flip-flop circuit is seen to be the same as described above, at the termination of the $I_{RA}$ clock pulse, and subsequent operation of the $I_B$ and $I_{RB}$ clock pulse sources provide transfer of the "1" in the core $S_1$ to the core $S_2$ and the operation of the flip-flop is regenerative. Thus, outputs are provided upon operation of the $I_A$ clock pulse source in every cycle of operation and the second or "ON" stable state at the flip-flop is realized.

Assume, while the circuit is operating, as described above, wherein outputs are provided upon operation of the $I_A$ clock pulse source, providing a feedback into the loop A and leaving the core $S_1$ in the "1" state at the termination of $I_{RA}$ clock pulse source, an input (reset input) is provided into the dotted end of the winding 28 on the core $C_3$ at $I_B$ time or during operation of the $I_B$ clock pulse source. Operation of the $I_B$ clock pulse source provides a read signal to the winding 42 on the core $S_1$ which resets the core from the "1" to the "0" state to induce a voltage in the winding 10 with the dotted end positive causing a counter-clockwise current in loop A tending to write the core $C_3$ and read the cores $C_2$ and $C_1$. Since each of the cores $C_2$ and $C_1$ are already in the "0" state, the core $C_3$ tends to switch from the "0" to the "1" state. However, the input into the winding 28 on the core $C_3$ is such as to switch the core to the "0" state, providing an inhibiting effect and leaving the core $C_3$, after termination of the $I_{RB}$ clock pulse, in the "0" state, with the current energy in loop A dissipated by the resistor $R_1$. Upon termination of the $I_B$ clock pulse, all cores are left in the "0" state and thus the circuit is returned to the first stable state of operation wherein no outputs are provided.

It may be pointed out that the storage and coupling cores may be of square loop type material and in such instances a bias current may be provided to a further winding inductively associated with each of them individually, which biases the cores toward their positive threshold (write "1" direction), in speeding the operation of the system. Such bias windings are shown on each of the cores in the Fig. 2, connected with the source $I_{DC}$.

In the interest of providing a complete disclosure, details of one embodiment of the flip-flop device wherein ferrite cores are employed are given below, however, it is to be understood that other component values and current magnitudes may be employed with satisfactory operation obtained so that the values given should not be considered limiting.

With the clock pulse currents, $I_A$, $I_B$, $I_{RA}$ and $I_{RB}$ delivering a constant current of 0.5 ampere, the windings 32 and 42 may comprise fifteen turns and the windings 34, 36, 38, 40, 44 and 46 may comprise five turns. In the coupling circuits interconnecting the storage and coupling core, the windings 12, 14, and 18 may comprise twelve turns, the windings 10 and 24 may comprise five turns, and the windings 20 and 22 may comprise four turns, with the resistor $R_1$ of 8 ohms and the resistor $R_2$ of 4 ohms. The input windings 26 and 28 may comprise five turns and the output winding 30 may comprise twelve turns.

In this particular embodiment, a direct current bias of 0.100 ampere ($I_{DC}$) may be applied to a five-turn winding linking each core. Each of the coupling cores and the storage cores may comprise toroids of magnesium-manganese ferrite compositions having an outside diameter of 0.100 inch, inside diameter of 0.070 inch and thickness of 0.120 inch. This thickness may be obtained by stacking four cores, each of 0.030 inch thickness and winding the stack as a single core unit.

While there have been shown and described and pointed out the fundamental novel features of the invention as applied to a preferred embodiment, it will be understood that various omissions and substitutions and changes in the form of details of the device illustrated and in its operation may be made by those skilled in the art without departing from the spirit of the invention. One such variation may be accomplished by providing a single coupling core to replace the cores $C_2$ and $C_4$, for example. Considering the circuit with the deletion of the core $C_4$ and providing further output winding 30a on the core $C_2$, the circuit operation is seen to be similar to that described above with an output engendered when the "1" is transferred from the core $S_2$ to the core $S_1$. It is our intention therefore, to be limited only as indicated by the following claims.

What is claimed is:

1. A bistable device comprising a first and a second bistable magnetic storage core; control winding means on each of said storage cores; a first, a second, a third and a fourth bistable magnetic coupling core; input and output winding means on each of said coupling cores; circuit means including a resistor connecting the output winding means on said first coupling core with the output winding means on said second coupling core and the control winding means on said first storage core and one of said input winding means on said third coupling core; further circuit means including a further resistor connecting the output winding means on said third coupling core with the control winding means on said second storage core and the input winding means on said fourth coupling core and the input winding means on said second coupling core; a first, a second, a third and a fourth clock pulse source adapted to deliver a series of pulses displaced in time; shift winding means on each of said first, second and fourth coupling core and said second storage core connected with said first clock pulse source and adapted to drive said first, second and fourth coupling core and said second storage core to a datum residual state when energized; shift winding means on said first storage core connected with said second clock pulse source adapted to drive said first storage core to the datum residual state when energized; shift winding means on said first storage core and said third coupling core connected with said third clock pulse source adapted to drive said first storage core and said third coupling core to the datum residual state when energized; and shift winding means on said second storage core connected with said fourth clock pulse source adapted to drive said second storage core to the datum residual state when energized.

2. A flip-flop comprising in combination, a first and a second bistable storage magnetic core; control winding means on each of said storage cores; a first, a second, a third and a fourth bistable coupling core; input and output winding means on each of said coupling cores; circuit means connecting the output winding means on said first coupling core with the output winding means on said second coupling core and the control winding means on said first storage core and one of the input winding means on said third coupling core; further circuit means connecting the output winding means on said third coupling core with the control winding means on said second storage core and the input winding means on said fourth coupling core and the input winding means on said second coupling core; shift winding means on said first coupling core series connected with shift winding means on said second coupling core and shift winding means on said fourth coupling core and shift winding means on said second storage core adapted to be energized from a first clock pulse source and to drive each of said first, second and fourth coupling core and said second storage core toward a datum residual state; shift winding means on said first storage core adapted to be energized from a second clock pulse source and to drive said first storage core the datum residual state; shift winding means on said first storage core series connected with shift winding means on said third coupling core adapted to be energized from a third clock pulse source and to drive said first storage core and said third coupling core to the datum residual state; and shift winding means on said second storage core adapted to be energized from a fourth clock pulse source and to drive said second storage core to the datum residual state.

3. The device as described in claim 2 including means for biasing at least said storage cores toward an opposite residual state.

4. A device as described in claim 2 including means for energizing said shift winding means including said first, second, third and fourth clock pulse source wherein said sources are actuated in sequence in the order named.

5. A logical flip-flop circuit comprising a first and a second bistable storage magnetic core; control winding means on each of said storage cores; a first, a second, a third and a fourth bistable coupling core; input and output winding means on each of said coupling cores; circuit means connecting the output winding means on said first coupling core with the output winding means on said second coupling core and the control winding means on said first storage core and one of the input winding means on said third coupling core; further circuit means connecting the output winding means on said third coupling core with the control winding means on said second storage core, the input winding means on said fourth coupling core and the input winding means on said second coupling core; shift winding means on each of said first, second and fourth coupling core and said second storage core adapted to be energized simultaneously and to drive each of said first, second and fourth coupling core and said second storage core to a datum residual state; shift winding means on said first storage core adapted to drive said first storage core to the datum residual state when energized; further shift winding means on said first storage core and said third coupling core adapted to be energized simultaneously and to drive said first storage core and said third coupling core to the datum residual state; and additional shift winding means on said second storage core adapted to drive said second storage core to the datum residual state when energized.

6. A bistable device comprising a first and a second storage magnetic core; a first, a second, a third, and a fourth coupling core; each of said cores formed of material having a substantially rectangular hysteresis characteristic and a switching threshold; control winding means on each of said storage cores; input and output winding means on each of said coupling cores; circuit means connecting the output winding means on said first coupling core with the output winding means of said second coupling core and the control winding means on said first storage core and one of the input winding means on said third coupling core; further circuit means connecting the output winding means on said third coupling core with the control winding means on said second storage core and the input winding means on said fourth coupling core and the input winding means on said second coupling core; shift winding means on said first coupling core series connected with shift winding means on said second coupling core and shift winding means on said fourth coupling core and shift winding means on said second storage core adapted to be energized from a first clock pulse source and to drive each of said first, second and fourth coupling cores and said second storage core toward a datum residual state; shift winding means on said first storage core adapted to be energized from a second clock pulse source and to drive said first storage core the datum residual state; shift winding means on said first storage core series connected with shift winding means on said third coupling core adapted to be energized from a third clock pulse source and to drive said first storage core and said third coupling core to the datum residual state; shift winding means on said second storage core adapted to be energized from a fourth clock source and to drive said second storage core to the datum state; and means for biasing all of said cores toward an opposite residual state.

7. A device as described in claim 6 including means for energizing said shift winding means including said first, second, third, and fourth clock pulse source wherein said sources are actuated in sequence in the order named.

8. A flip-flop device comprising a first and a second storage magnetic core; a first, a second, a third and a fourth coupling core; each of said cores formed of material having a substantially rectangular hysteresis characteristic and having a switching threshold; control winding means on each of said storage cores; input and output winding means on each of said coupling cores; circuit means including a resistor series connecting the output winding means on said first coupling core with the output winding means on said second coupling core and the control winding means on said first storage core and one of the input winding means on said third coupling core; further circuit means including a further resistor series connecting the output winding means on said third coupling core with the control winding means on said second storage core and the input winding means on said fourth coupling core and the input winding means on said second coupling core; shift winding means on said first coupling core series connected with shift winding means on said second coupling core and shift winding means on said fourth coupling core and shift winding means on said second storage core connected with a first clock pulse source so as to drive said first, second and fourth coupling core and said second storage core to a datum residual state when energized; shift winding means on said first storage core connected with a second clock pulse source so as to drive said first storage core to the datum residual state when energized; shift winding means on said first storage core series connected with shift winding means on said third coupling core and connected with a third clock pulse source so as to drive said first storage core and said third coupling core to the datum residual state when energized; shift winding means on said second storage core connected with a fourth clock pulse source so as to drive said second storage core to the datum residual state when energized; and means for energizing said shift winding means including said first, second, third and fourth clock pulse sources wherein said sources are actuated in sequence in the order named.

9. A device as described in claim 8 including means for biasing all of said cores toward an opposite residual state.

References Cited in the file of this patent

UNITED STATES PATENTS

| | | |
|---|---|---|
| 2,741,758 | Cray | Apr. 10, 1956 |
| 2,776,380 | Andrews | Jan. 1, 1957 |
| 2,828,477 | Lanning | Mar. 25, 1958 |
| 2,846,593 | Sands | Aug. 5, 1958 |